(12) United States Patent
Suhail et al.

(10) Patent No.: US 8,204,192 B1
(45) Date of Patent: Jun. 19, 2012

(54) DOCUMENTED CALL LOG

(75) Inventors: Atiya Suhail, Plano, TX (US);
Kashipati G. Rao, Plano, TX (US);
Sudheer Mamidipaka, Redmond, WA (US); Snehal Desai, Plano, TX (US)

(73) Assignee: Alcatel Lucent, Paris (FR)

( * ) Notice: Subject to any disclaimer, the term of this patent is extended or adjusted under 35 U.S.C. 154(b) by 1496 days.

(21) Appl. No.: 11/026,992

(22) Filed: Dec. 30, 2004

(51) Int. Cl.
*H04M 1/56* (2006.01)
*H04M 15/06* (2006.01)
*H04M 3/42* (2006.01)

(52) U.S. Cl. .............................. 379/142.06; 379/214.01

(58) Field of Classification Search ............. 379/142.01, 379/142.06, 142.07, 142.15, 85, 87, 88.25, 379/88.27, 212.01, 214.01
See application file for complete search history.

(56) References Cited

U.S. PATENT DOCUMENTS

| | | | | |
|---|---|---|---|---|
| 5,228,073 A | * | 7/1993 | Smith | 455/415 |
| 6,404,856 B1 | * | 6/2002 | Wilcox et al. | 379/67.1 |
| 6,442,251 B1 | * | 8/2002 | Maes et al. | 379/93.23 |
| 7,197,123 B1 | * | 3/2007 | Gilbert | 379/142.01 |
| 2001/0036254 A1 | * | 11/2001 | Davis et al. | 379/67.1 |
| 2003/0063732 A1 | * | 4/2003 | Mcknight | 379/210.01 |
| 2003/0148753 A1 | * | 8/2003 | Pappalardo et al. | 455/405 |
| 2004/0013243 A1 | * | 1/2004 | Harris | 379/67.1 |

* cited by examiner

*Primary Examiner* — Quoc D Tran

(57) ABSTRACT

A call documentation system (10) stores a call log of calls for a user in a call log database (30). The user can prepare a note (22) and the system associates the note with an entry in the call note database (30). Typically, notes are stored in a log notes database (32) which is linked to the call note database (30) through a database manager (29). Notes can be shared with other users.

20 Claims, 3 Drawing Sheets

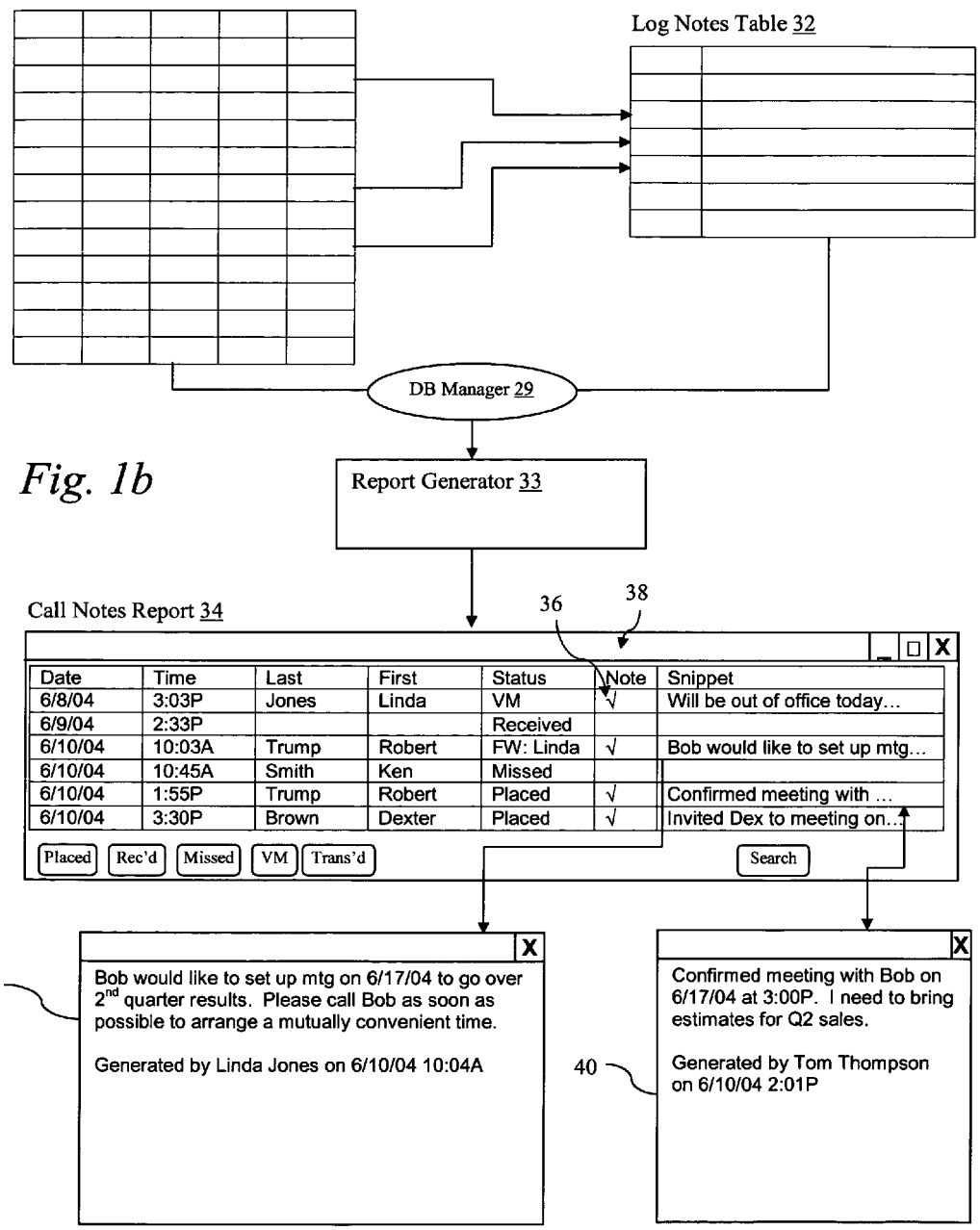

DOCUMENTED CALL LOG

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a call logs.

2. Description of the Related Art

Despite the increase in communication using electronic mail, voice communication remains the most import form of communication, particularly for business communication. Unfortunately, after a voice communication, there is generally relatively little documentation of the conversation.

The most popular way to document a telephone conversation is record the important points on a notepad or electronic file. Unless the note taker is extremely particular about details, it is difficult to relate the notes to a particular conversation at a later date. Notes are easily lost and often difficult to find even if efficiently stored.

Another way to document a telephone conversation is to record the conversation. In many jurisdictions, it is illegal to record a conversation without the permission of both parties. Further, the size of the files, stored either electromagnetically on tape, or electronically in a computer file, makes long term storage of the recorded conversation impractical. Additionally, it is difficult to search an audio file to retrieve information.

Accordingly, a need exists for a method and apparatus for efficiently documenting a telephone conversation.

BRIEF SUMMARY OF THE INVENTION

In the present invention, documentation related to a telephone call is maintained by storing a call log of calls for a user in a call log database, collecting information associated with a call in an electronic note, and associating the note with an entry in the call log database.

The present invention allows a user to easily retrieve and modify the notes through use of the call log.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1b illustrates a database structure for associating notes with call log entries;

DETAILED DESCRIPTION OF THE INVENTION

Figure 1A:
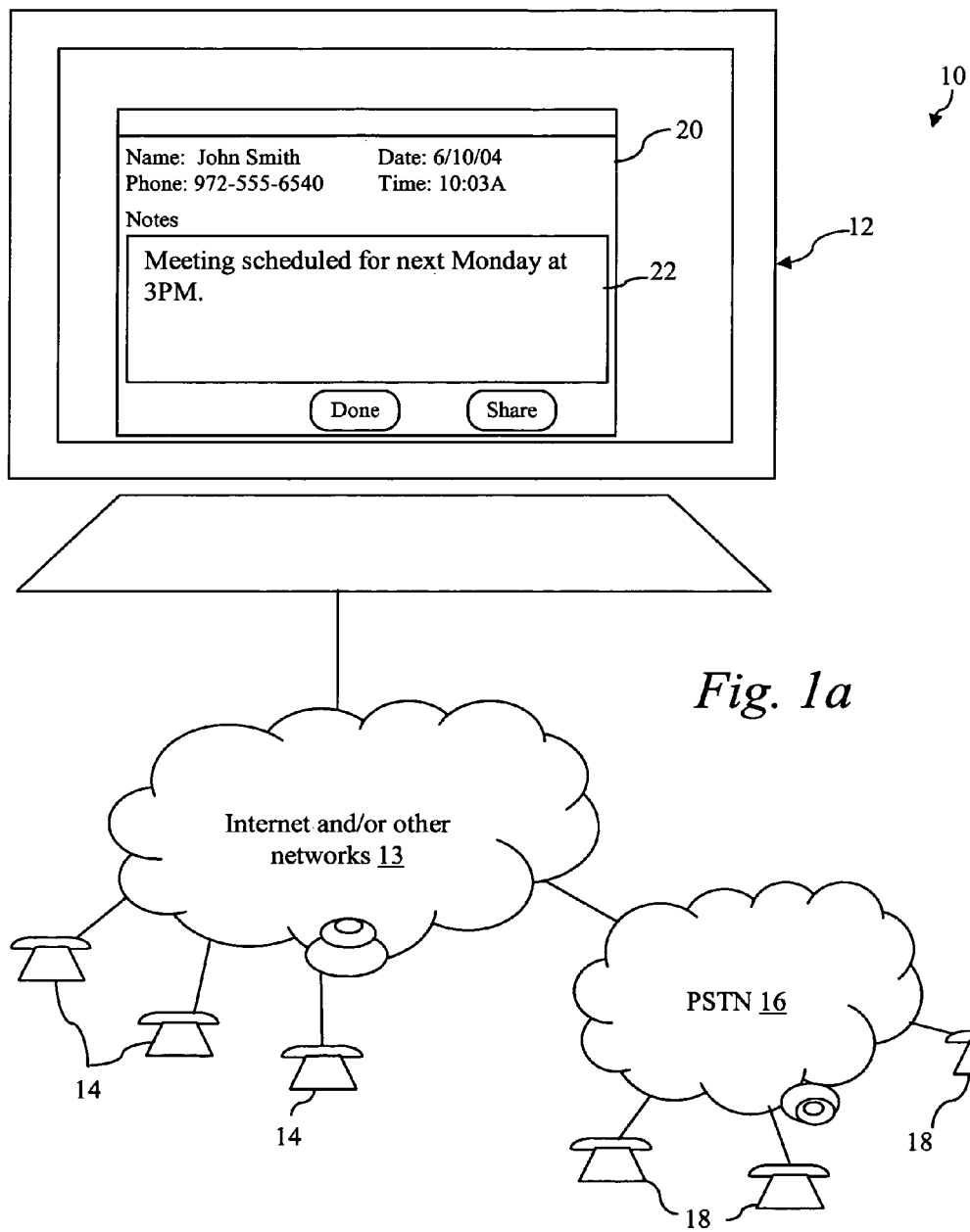
FIG. 1a illustrates a system for documenting phone conversations.
Figure 2:
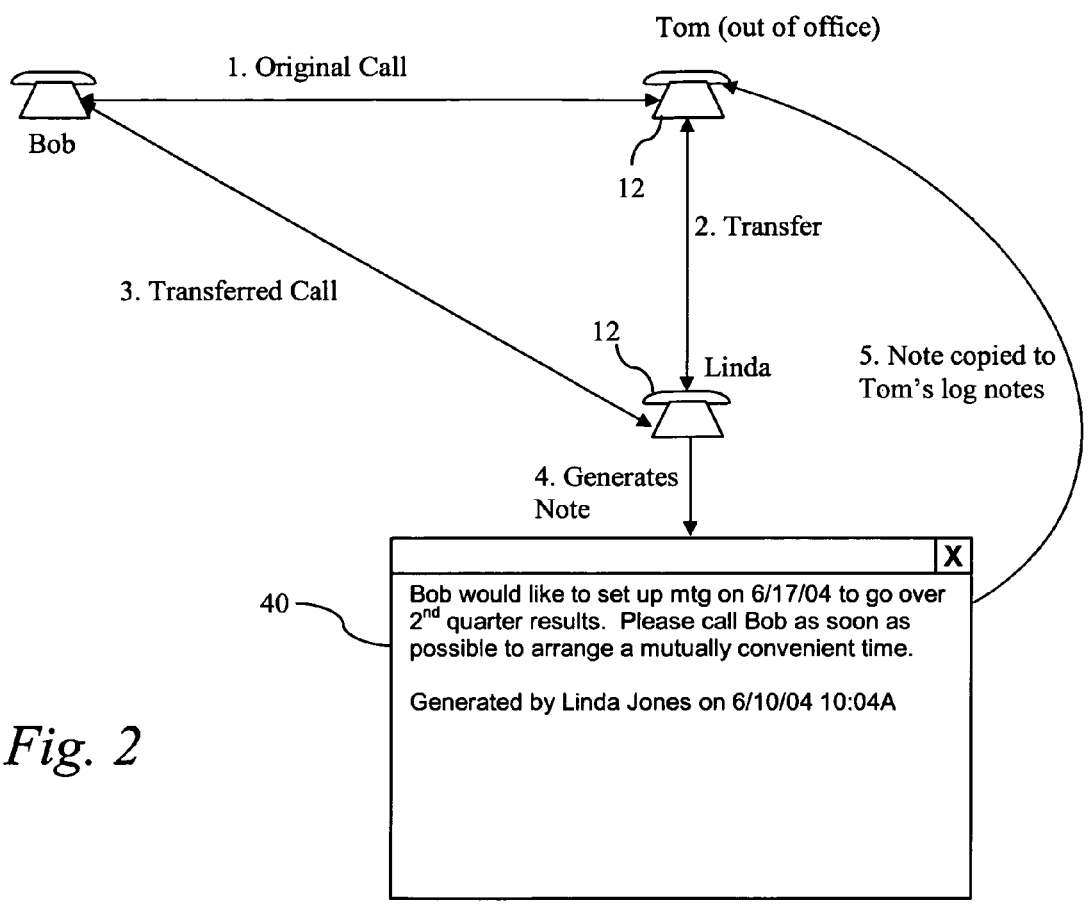
FIG. 2 illustrates sharing of notes for transferred calls.

The present invention is best understood in relation to FIGS. 1-2 of the drawings, like numerals being used for like elements of the various drawings.

In the present invention, electronically stored notes are associated with call log to document conversations. Many phones, including PSTN (public switched telephone network), mobile, and VOIP (voice over internet protocol) phones, maintain a call log of call received by the phone and, in some cases, calls placed by the user. Generally, the type of information maintained by these call logs include the name and/or phone number of the other party, the date and time of the call, and the disposition of the call (i.e., "missed", "received", "placed").

FIGS. 1a and 1b illustrate a phone system 10 which provides the capability to add notes to a call log for easy retrieval. For purposes of illustration, the phone system 10 will be discussed in connection with a "soft phone", i.e., a phone 12 that operates on a computing device, which would include, for example, desktop computers, mobile computers, PDAs (personal digital assistants), smart phones, and so on. A soft phone provides the capability to establish voice connections over one or more networks 13, such as the Internet. As shown in FIG. 1a, the phone 12 is coupled to the Internet (possibly through another network, not shown) for communication with other VOIP phones 14. The phone 12 can also communicate with traditional phones 16 through a connection with the PSTN 18.

FIG. 1a illustrates an example of a dialog box 20 which is shown on the computing device when a call is established. The dialog box 20 provides a "Notes" field 22 which can be used to enter text to be associated with a call log entry. Normally, notes are associated with completed calls, but a note could be associated with missed call (such as, "Returned call today"), a call that was transferred to voice mail (such as, "Mark left voice mail regarding meeting"), or a call that was transferred to an assistant (discussed in greater detail below).

Typically, when a voice connection is established, either because the user initiated a call that was answered, or accepted a call from another party, the dialog box 12 the phone 12 automatically invokes the dialog box 14. When appropriate, the phone 12 can automatically fill in fields, such as the name of the other party, the phone number of the other party, the date of the call and the time of the call. Other information could be included in the dialog box as well.

Once the user is done taking notes, the "done" button can be pressed. Further, the note can be shared with other users by pressing the "share" button.

Input to the dialog box would typically be accomplished through a keyboard, or through a dialing pad. A more advanced interface could use voice recognition and/or handwriting recognition. In one embodiment, voice recognition is used to generate a transcription of the conversation into the Notes field 22, which can be edited by the user.

FIG. 1b illustrates a structure that can be used to store the notes. A database manager 29 maintains a call log database 30 and a log notes database 32. The call log database 30 includes entries for each call associated with a user. It is assumed, but not necessary that the call log database 30 is a unified account of the user's calls, i.e., that it has entries for received calls, missed calls, calls transferred to another party, calls transferred to voice mail, and calls placed. Alternatively, separate call note databases 30 could be used for each category.

Entries in the call log database 30 that have an associated log note have a relational association with the log note database 32. Each entry in the log note database includes one or more field to relate an the entry with the associated entry in the call log database 30.

On the phone, the user can view a report 34 produced by report generator 33 showing information from the call log. The form shows information from the call log database 32, and possibly includes a "snippet" from the log note database 32 (for example, the first ten words). Each entry in the report which has an associated log note includes an identifier (such as a checkmark or icon) 36 in the Note field 38. If so, the user can view the entire note in a separate window 40 by a predetermined action, such as clicking on the identifier or right-clicking on the entry and selecting "Show Note", or by another user interface action.

When selected, the note is provided in a separate window. If the user is the owner of the note, or has been given permission, the note can be edited. In the preferred embodiment, the note maintains a history so that it can be determined when the note was created and when it was edited. A text-to-speech (TTS) program could read back the note to the user.

In some cases, the user may want to generate a note for an entry at a time not concurrent with the conversation. For example, if the user has been out of the office, notes may be generated after his or her return. This can be accomplished by clicking on the Note field for a particular entry or by right-clicking the entry and selecting "Add note".

Usually, a single note per entry is sufficient. In an alternative embodiment, however, multiple log notes could be associated with a single call log entry. A list could be provided to the user to select one of the notes; the list could include, for example, the date and time of creation and a snippet from the note.

In the preferred embodiment, the call log report 34 can be sorted on any field by clicking on a field heading. The report 34 can be filtered by clicking on one of the filter buttons, such as "Placed", "Received", "Missed", "VM" or "Transferred". The log notes database 32 can be searched for key words by pressing the "Search" button.

Additionally, in the preferred embodiment, the user can view the call log report 34 and note windows 40 by accessing a web page from any computer coupled to the Internet.

The call log database 30, log notes database 32 and database manager 29 could be located in many different places. They could be located on the individual computing devices executing the soft phone application, on a local area network or wide area network file server, or on a globally accessible location, such as the Internet. Locating the files so that they are accessible over the Internet provides the advantage that the log notes can be accessed from any location.

FIG. 2 illustrates a scenario for transferred calls. In this scenario, the user, Tom, receives a call from Bob. Because Tom is not in the office, the call is transferred to his assistant Linda. Linda documents the call by preparing a note using dialog box 20.

In the preferred embodiment, a call note is shared with upstream users (in this case, Tom) by default. Thus, the log note for this call is associated with the call log entry for the original call from Bob to Tom, as well as with the call log entry associated with the eventual connection between Bob and Linda. Assuming separate log databases 32 exist for each user, this can be accomplished by passing an identifier for the call log entry for the call from Bob to Tom along with the transferred call; the identifier and note would then be placed in Tom's log note file 32 (and in Linda's log note file 32, using the identifier for the connection between Bob and Linda).

In this scenario, when Tom views his call log report 34, an identifier for the note will show up for the entry from Bob to Tom, also showing that the call was transferred to Linda (see FIG. 1b).

In the preferred embodiment, Linda has the option of not sharing the note. This could be accomplished by pressing the "share" button on dialog box 22 and indicating that the note should not be shared.

Similarly, log notes can be shared by participants in a conference call. Each participant to a conference call could take notes and associate them with their call log. Optionally, each note could be shared with any or all of the other users, and associated with the other user's call log.

In one embodiment, multiple conference call participants could participate in the generation of a single note which would be associated with each of the participant's call log. The note could be formatted similar to an on-line chat session where each participant's contribution is automatically identified by name or alias. When the note was completed, it would automatically be associated with the entry for the conference call.

While the present invention has been discussed in relation to textual notes, other objects could be entered into the note. For example, graphics or video could be added to the note. The note could include links to other files, such as presentations and spreadsheets, or to Web pages. It would also be possible to digitally record all or part of a telephone conversation and add it to the note, either as an embedded voice file or as a link to the voice file.

The present invention could also be used with PSTN phones 18 (including cellular phones). In this case, the call log database 30 and log note database 32 could be maintained by a central office associated with the phone. The user could access the report 34 over the Internet to add and modify notes to the call log.

The present invention provides significant advantages over the prior art. First, notes regarding telephone calls are maintained in a manner which facilitates retrieval at a later time. In this regard, the call log database 30 is will generally be persistent (commonly, existing call logs hold a relatively small number of the most recent calls), subject to archiving. Call log entries without notes can be optionally be deleted at the time of archiving. Second, notes can be easily shared between users and, in particular, between participants to a conference call.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A system for documenting telephone calls, comprising:
a call log database for storing a call log of calls for a user;
circuitry for collecting information associated with a call in an electronic note and associating the note with an entry in the call log database; and
a report produced by a report generator showing information from the call log database wherein the report includes a status entry field that permits entries to be expressly designated as missed calls, placed calls, returned calls, received calls, forwarded calls and calls that went to voicemail and a note field that permits addition of a note for an entry that currently lacks one and that contains a note identifier that can be clicked on to open the note in a separate window.

2. The system of claim 1 wherein the notes for multiple calls are manually entered and stored in a log note database and the report includes a snippet from the log note database and a dialog box automatically opens to permit manual entry of the notes upon one of a beginning of the call or during the call.

3. The system of claim 2 further comprising a database manager for maintaining relations between the call log database and the log note database and wherein the note field permits addition of the note related to a substantive content of the call after the report is generated.

4. The system of claim 1 wherein the database manager provides the ability for the user to associate a note with a call log entry for a different user.

5. The system of claim 4 where each user has a separate call log database.

6. The system of claim 4 where the call log database stores call logs for multiple users.

7. The system of claim 4 wherein a note may be associated with call log entries for multiple participants to a conference call.

8. The system of claim 7 wherein the multiple participants are able to jointly prepare the note during the conference call.

9. The system of claim 4 wherein a note may be associated with a call log entry associated with a phone from which a call was transferred.

10. The system of claim 1 wherein said call log database is accessible of a globally available network.

11. A method of documenting telephone calls, comprising:
   storing a call log of calls for a user in a call log database;
   collecting information associated with a call in an electronic note;
   associating the note with an entry in the call log database; and
   generating a report with a report generator that shows information from the call log database wherein the report includes a status entry field that permits entries to be expressly designated as missed calls, placed calls, returned calls, received calls, forwarded calls and calls that went to voicemail and a note field that permits addition of a note for an entry that currently lacks one and that contains a note identifier that can be clicked on to open the note in a separate window.

12. The method of claim 11 wherein said storing step comprises the step of storing the notes for multiple calls in a log note database and generating the report includes creating a snippet from the log note database.

13. The method of claim 12 further comprising the step of maintaining relations between the call log database and the log note database with a database manager.

14. The method of claim 11 wherein the associating step further comprises the step of associating a note with a call log entry for a different user.

15. The method of claim 14 where each user has a separate call log database.

16. The method of claim 14 where the call log database stores call logs for multiple users.

17. The method of claim 14 wherein said associating step comprises the step of associating a note with call log entries for multiple participants to a conference call.

18. The method of claim 14 and further comprising the step of jointly preparing the note by the multiple participants.

19. The method of claim 14 wherein said associating step comprises the step of associating a note with a phone from which a call was transferred.

20. The method of claim 11 wherein said call log database is accessible of a globally available network.

\* \* \* \* \*